(No Model.)

J. P. LAVIGNE.
CLUTCH MECHANISM FOR STAPLE STITCHING MACHINES.

No. 442,380. Patented Dec. 9, 1890.

Witnesses:
J. N. Shumway
L. D. Kelsey

Joseph P. Lavigne
Inventor
By Atty
Earle Seymour

UNITED STATES PATENT OFFICE.

JOSEPH P. LAVIGNE, OF NEW HAVEN, CONNECTICUT.

CLUTCH MECHANISM FOR STAPLE-STITCHING MACHINES.

SPECIFICATION forming part of Letters Patent No. 442,380, dated December 9, 1890.

Application filed October 6, 1890. Serial No. 367,198. (No model.)

*To all whom it may concern:*

Be it known that I, JOSEPH P. LAVIGNE, of New Haven, in the county of New Haven and State of Connecticut, have invented new Improvements in Clutch Mechanism for Staple-Stitching Machines; and I do hereby declare the following, when taken in connection with accompanying drawings and the letters of reference marked thereon, to be a full, clear, and exact description of the same, and which said drawings constitute part of this specification, and represent, in—

Figure 1:
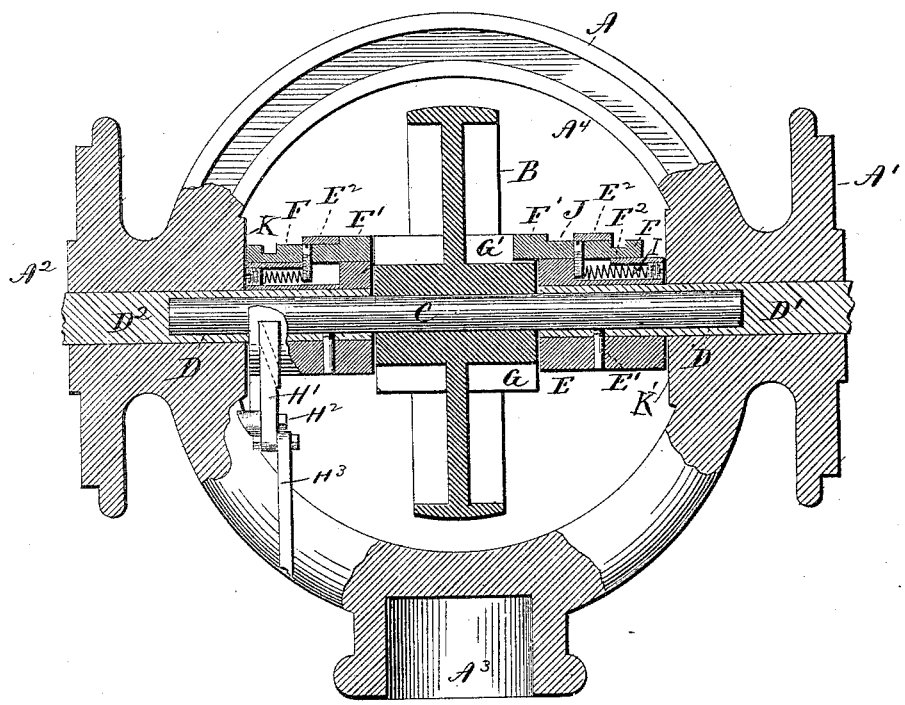
Figure 2:
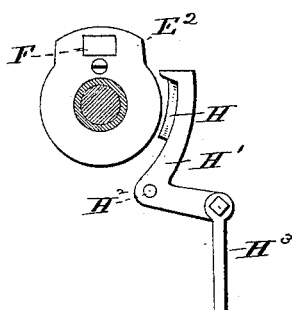

Figure 1, a view, partly in elevation and partly in vertical section, of a frame-head having its driving-connections constructed in accordance with my invention; and Fig. 2 a detached view in transverse section, showing the combined clutch and cam and the bell-crank clutch-lever by which the clutch-pin is operated.

My invention relates to an improvement in that class of staple-stitching machines in which independent stitching mechanisms are applied to the opposite sides of a head containing driving-connections with which the said mechanisms may be coupled for independent or simultaneous operation, the object being to simplify the said driving-connections.

With this end in view my invention consists in the combination, with an open frame-head adapted to have two independent stitching mechanisms applied to its opposite sides, respectively, of two independent driven shafts mounted in the frame-head in line with each other and having their adjacent inner ends socketed, a driving-shaft having its ends entered into the socketed ends of the driven shafts, a pulley located in the opening of the head and loosely mounted upon the driving-shaft and interposed between the ends of the driven shafts, and two clutch mechanisms also located in the opening of the head and combined with the driven shafts, respectively, for coupling them with the pulley.

My invention further consists in certain details of construction and combinations of parts, as will be hereinafter described, and pointed out in the claims.

As herein shown, the open frame-head A is circular in general outline and provided upon its opposite sides with heads $A'$ and $A^2$, to which the independent stitching mechanisms are respectively applied, and at its lower edge with a socket $A^3$, by means of which it is connected with the lower part or standard of the machine-frame. The said head has a central opening $A^4$ of substantially circular form and receiving the driving-pulley B, which is loosely mounted upon the driving-shaft C, the opposite ends whereof are respectively entered into sockets D, formed in the inner ends of two driven shafts $D'$ and $D^2$, which are journaled in line with each other in the said head and extend through and project beyond the heads $A'$ and $A^2$ aforesaid and drive the independent stitching mechanisms, which are not herein shown. Each of these driven shafts $D'$ and $D^2$ is provided with an independent clutch mechanism for coupling it with the pulley, so that the stitching mechanisms may be independently or simultaneously operated. These clutch mechanisms may be of any approved construction. As herein shown, each consists of a combined clutch and cam E, rigidly connected with its appropriate driven shaft by means of a pin $E'$, and provided with a cam-lug $E^2$, the face whereof actuates an operating-rod. (Not herein shown.) This lug is transversely chambered to receive a spring-actuated clutch-pin F, one end of which is provided with a head $F'$, which when projected is engaged by one or the other of two lugs G and $G'$, formed upon one side of the pulley B, the other side whereof is provived with corresponding lugs for co-operation with the spring-actuated clutch-pin of the other clutch mechanism, which is a duplicate of the mechanism now being described. The opposite end of the said clutch-pin F projects beyond the outer end of the said lug $E^2$ and is provided with a groove $F^2$, which, as the combined clutch and cam is rotated, engages with the lower end of an inclined rib H, formed upon the under face of a bell-crank clutch-lever $H'$ and arranged so that as the cam revolves it will withdraw the clutch-pin and disengage the head F thereof from that one of the two lugs G and $G'$ on the pulley B with which it may be engaged. A spring I, located in a chamber formed in the cam $E^2$ and connected with the clutch-pin by a pin J, is provided for actuating the clutch-pin in the opposite direction and automatically throwing it into position for engagement by the said lugs of the driving-pulley. The said bell-crank clutch-lever H' is hung from the head A on a stud H², and is connected by an operating-rod H³ with a treadle, which is not shown, the clutch-pin being released for re-engagement with the lugs of the driving-pulley by depressing the treadle, whereby the clutch-lever is entirely withdrawn from engagement with the grooved clutch-pin.

The driving-pulley B is interposed, it will be noted, between the inner ends of the two parts E, each constituting a combined cam and clutch, as has been mentioned, the outer ends of the said parts E running against vertical faces K and K', formed in the open frame-head A.

Under the described construction either or both of the driven shafts D' and D² may be connected with the driving-pulley for the independent or simultaneous operation of the independent stitching mechanisms by simply operating the treadles which control the respective clutch mechanisms, as has been set forth.

It is apparent that the shape of the head and the particular construction of the clutch mechanisms may be changed from the forms herein shown without departing from my invention. Thus the frame-head might be made different in form and in more than one piece. I would therefore have it understood that I do not limit myself to the exact construction and arrangement of parts herein shown and described, but hold myself at liberty to make such changes and alterations as fairly fall within the spirit and scope of my invention.

Having fully described my invention, what I claim as new, and desire to secure by Letters Patent, is—

1. The combination, with an open frame-head adapted to have two independent stitching mechanisms applied to its opposite sides, respectively, of two independent driven shafts mounted in the frame-head in line with each other and having their adjacent inner ends socketed, a driving-shaft having its ends entered into the socketed ends of the driven shafts, a pulley located in the opening of the head and loosely mounted upon the driving-shaft, and two clutch mechanisms also located in the opening of the head and combined with the driven shafts, respectively, for independently coupling the same with the driving-pulley, substantially as described.

2. The combination, with an open frame-head adapted to have two independent stitching mechanisms applied to its opposite faces, respectively, of two independent driven shafts mounted in the frame-head in line with each other and having their adjacent inner ends socketed, a driving-shaft having its ends entered into the socketed ends of the driven shafts, a pulley located in the opening of the head and loosely mounted upon the driving-shaft and interposed between the ends of the driven shafts, and two independent clutch mechanisms also located in the opening of the head, combined with the driven shafts, respectively, for coupling them with the pulley, and each comprising a combined clutch and cam rigidly secured to its appropriate driven shaft, a spring-actuated clutch-pin located in a chamber formed in the projecting cam-lug of the said combined clutch and cam, and a bell-crank clutch-lever provided upon its under face with an inclined rib, which is engaged by the grooved outer end of the clutch-pin for withdrawing the same against the tension of its spring from the path of the lugs upon the driving-pulley, substantially as described.

In testimony whereof I have signed this specification in the presence of two subscribing witnesses.

JOSEPH P. LAVIGNE.

Witnesses:
   GEO. D. SEYMOUR,
   FRED C. EARLE.